(No Model.) 7 Sheets—Sheet 2.
G. W. FULLER.
DYNAMO ELECTRIC MACHINE.
No. 294,458. Patented Mar. 4, 1884.
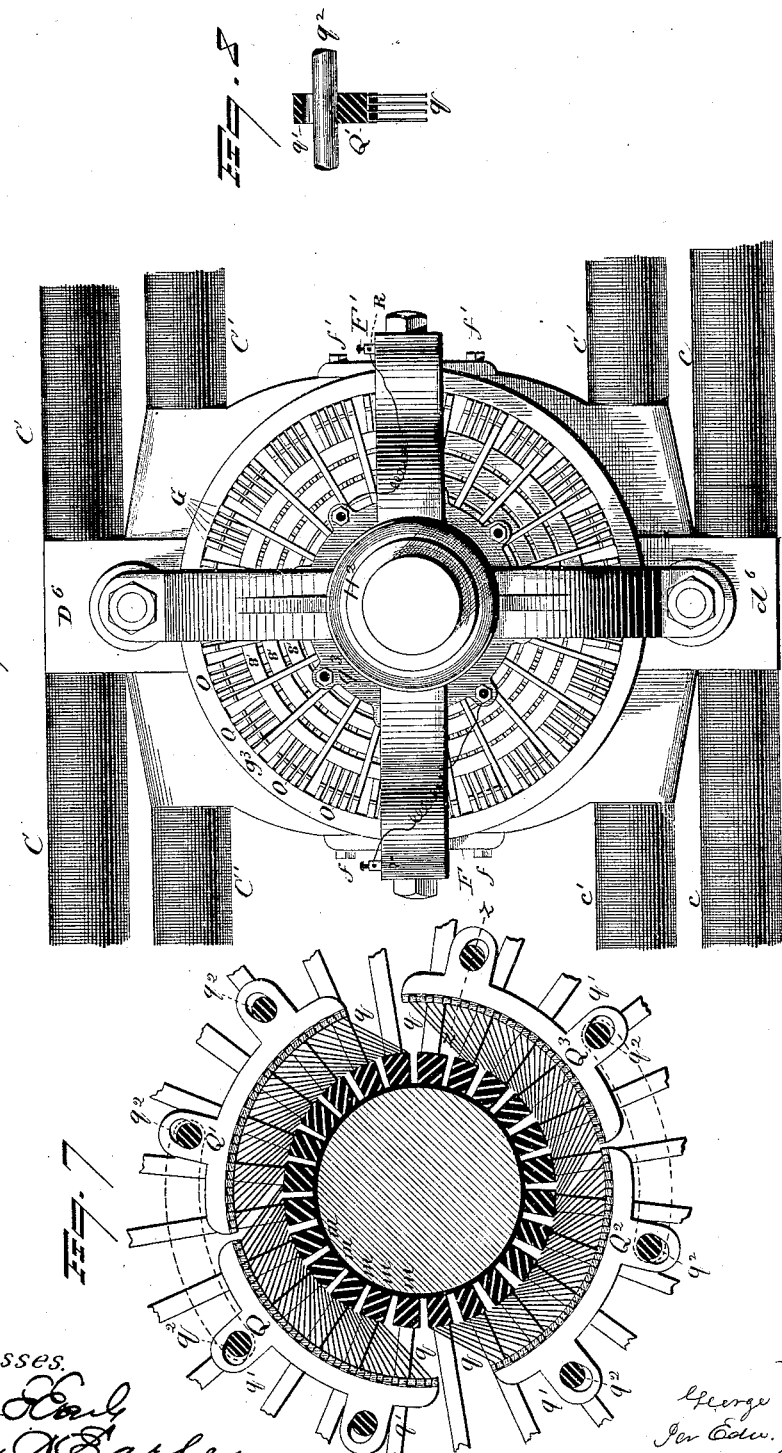
Witnesses.
Inventor (No Model.)  
7 Sheets—Sheet 3.
G. W. FULLER.
DYNAMO ELECTRIC MACHINE.
No. 294,458. Patented Mar. 4, 1884.
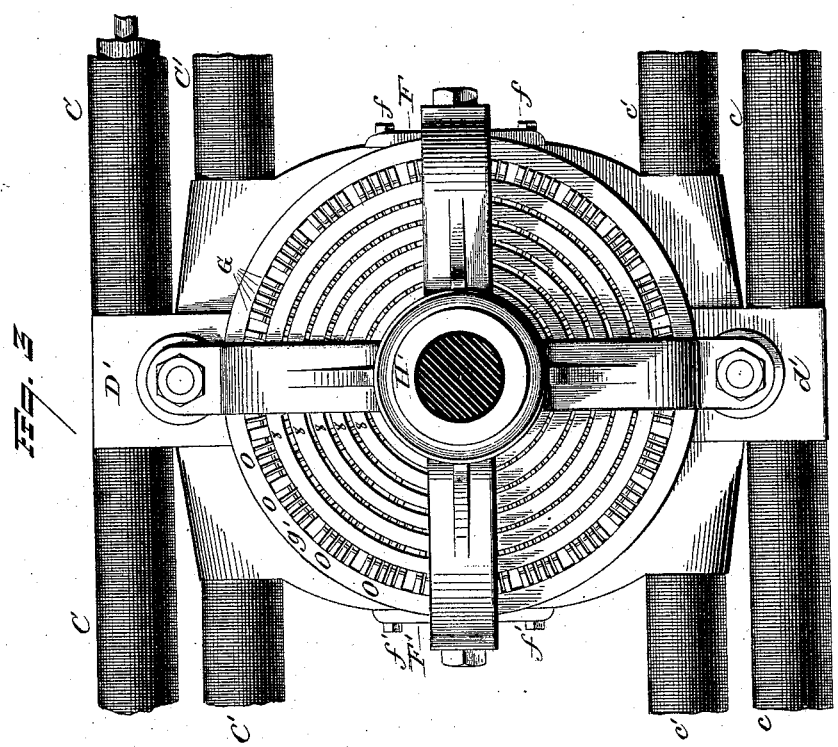
Witnesses  
Inventor  
George W. Fuller  
Per Edw. E. Quimby  
Atty.

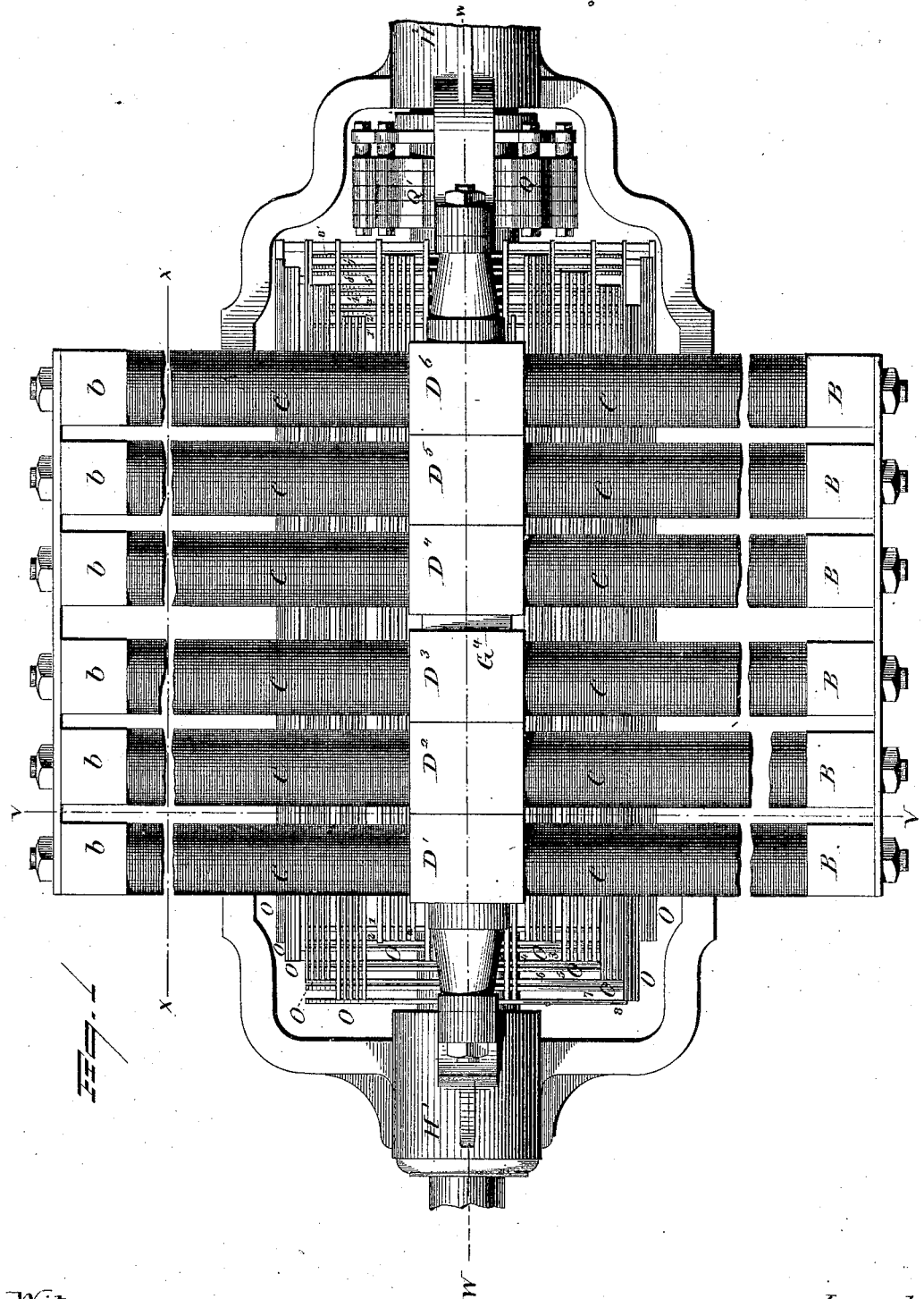

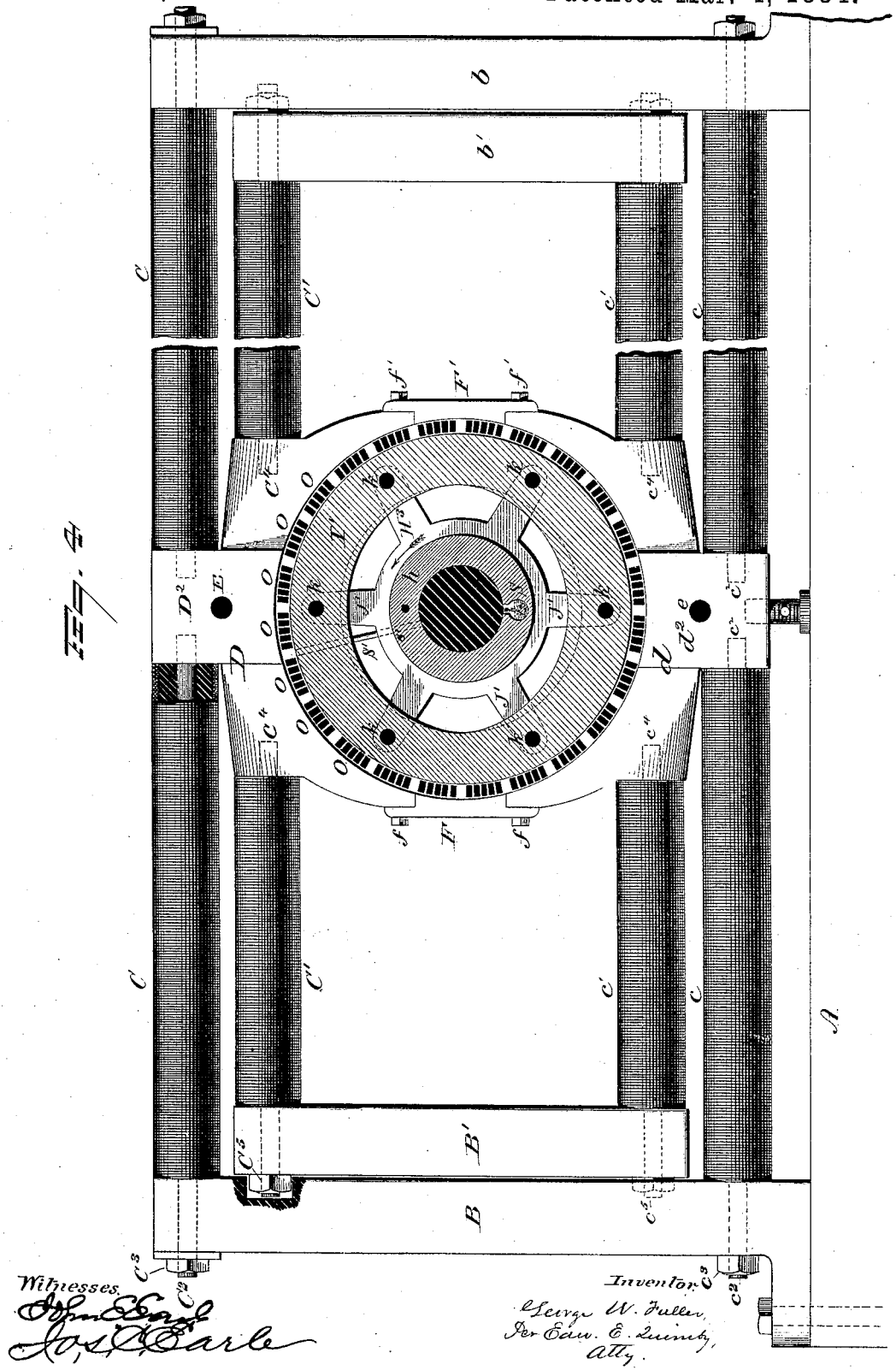

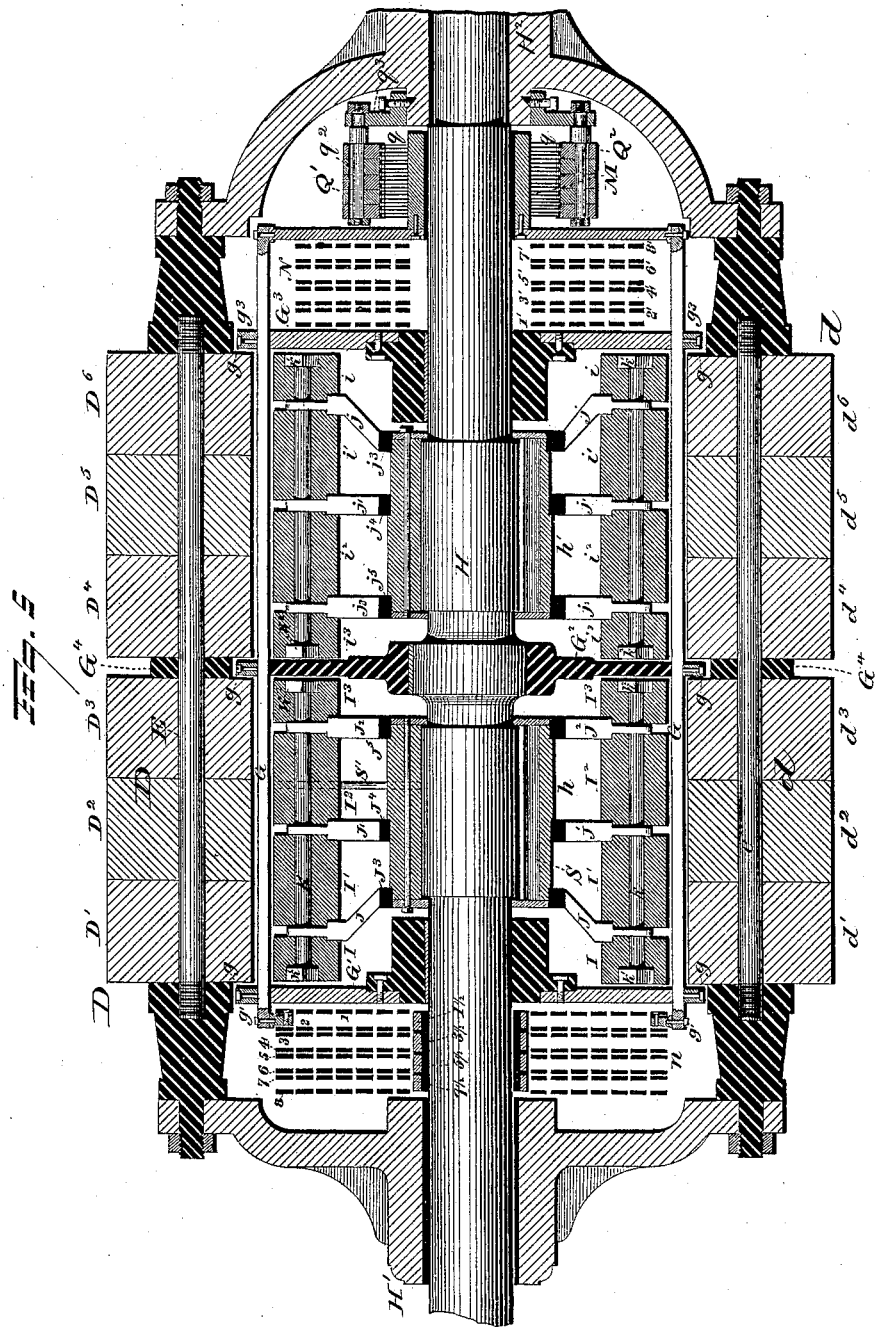

(No Model.)
G. W. FULLER.
DYNAMO ELECTRIC MACHINE.
No. 294,458.    Patented Mar. 4, 1884.
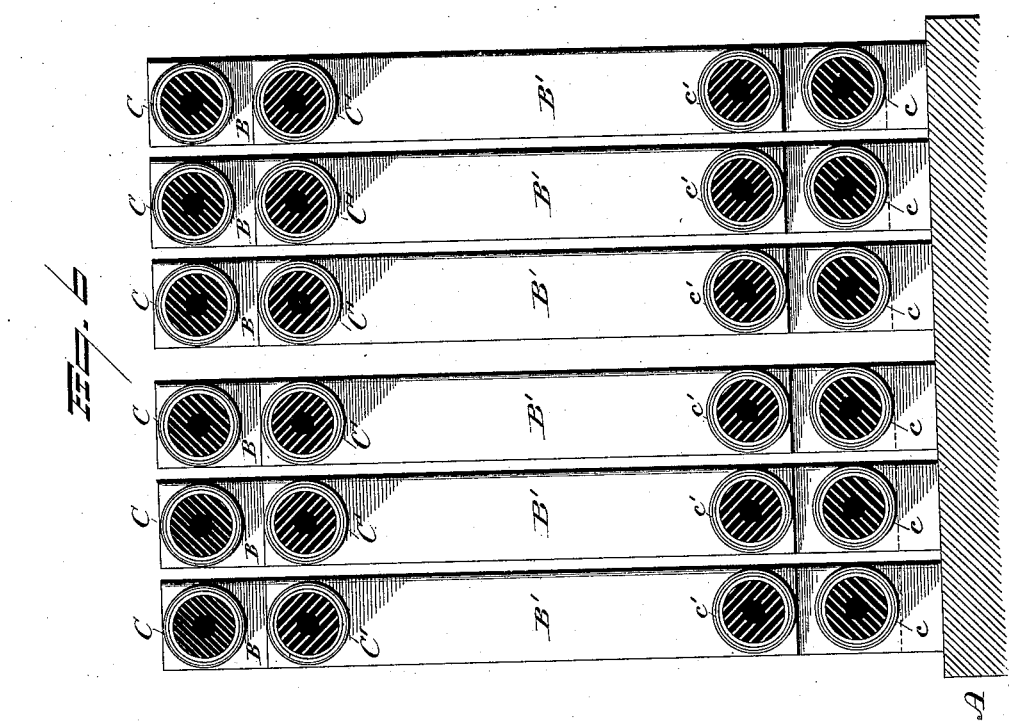
Witnesses.
Inventor
George W. Fuller
Per Edw. E. Quimby,
Atty.

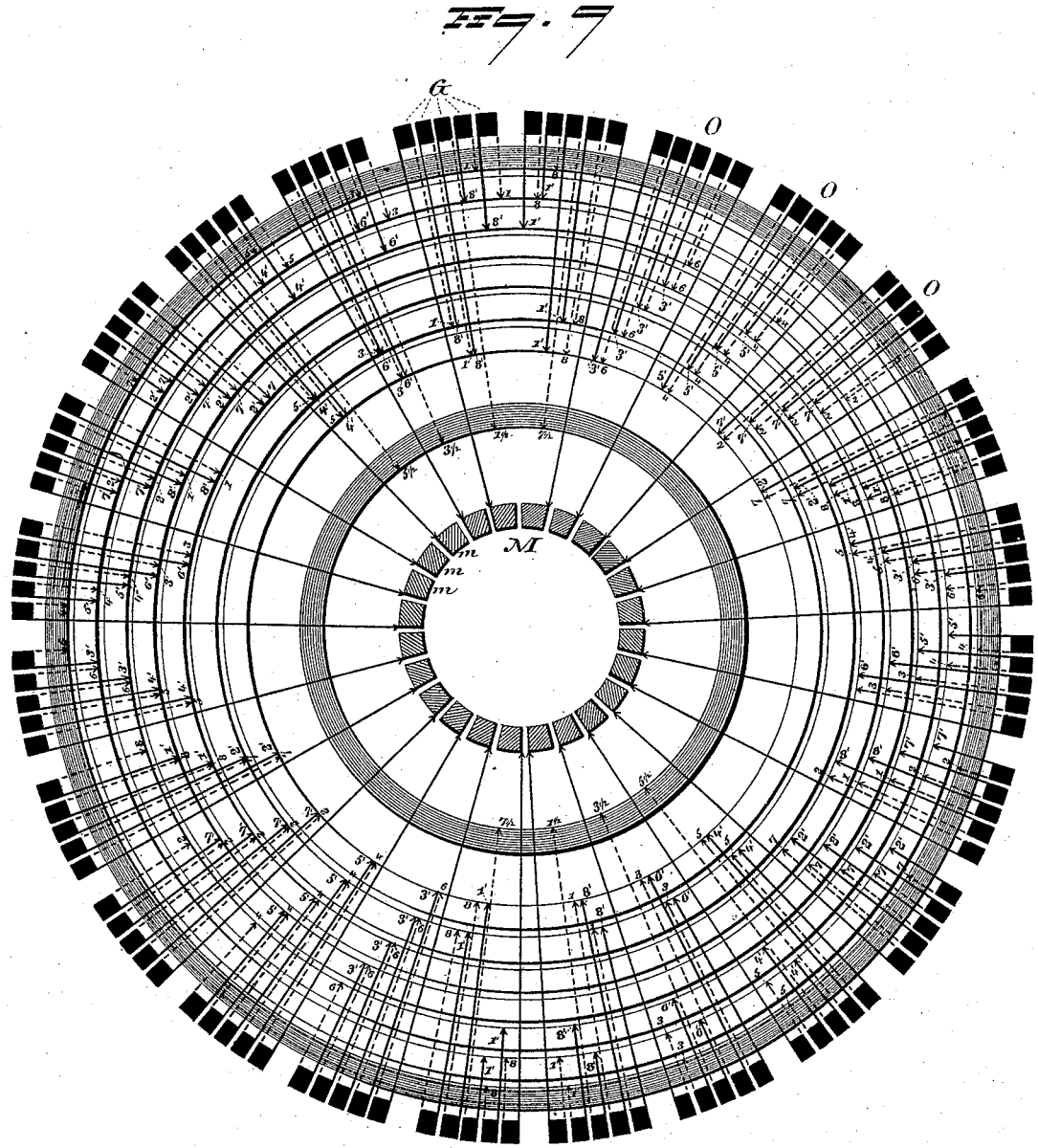

UNITED STATES PATENT OFFICE.

GEORGE W. FULLER, OF NORWICH, CONNECTICUT.

DYNAMO-ELECTRIC MACHINE.

SPECIFICATION forming part of Letters Patent No. 294,458, dated March 4, 1884.

Application filed February 19, 1883. (No model.)

*To all whom it may concern:*

Be it known that I, GEORGE W. FULLER, of Norwich, Connecticut, have invented a certain Improvement in Dynamo-Electric Machines, of which the following is a specification.

My improvements relate to the application, to dynamo-electric machines having cylindrical armatures of my invention, of an armature-core independent of the induction-coils surrounding it, and held in unchanging polar relations to the field-magnets by the attractive force of the field-magnets. This characteristic being common to several machines, which I have described in other pending applications, I designate the present case as "Case E." In this case my armature-core is of cylindrical form, and is loosely mounted upon a rotating shaft, upon which the induction-bars are supported, and by which they are rotated, the field-magnets being stationary. My present invention also includes a special arrangement of field-magnets in connection with pole-pieces, and a method of so connecting the induction-bars which traverse the armature with each other and with the commutator that I am enabled to avoid great elongation of the armature.

The accompanying drawings of a dynamo-electric machine embodying my improvements are as follows: Figure 1 is a top view. Fig. 2 is a front end elevation of the armature and adjacent parts. Fig. 3 is a rear end elevation of the armature and adjacent parts. Fig. 4 is a transverse vertical section through the line $v\,v$ on Fig. 1. Fig. 5 is a horizontal vertical section through the line $w\,w$ on Fig. 1. Fig. 6 is a vertical section through the line $x\,x$ on Fig. 1. Fig. 7 is a sectional end elevation, upon an enlarged scale, of the commutator, brushes, and adjacent parts. Fig. 8 is a transverse section through one of the brush-holders on line $z\,z$ of Fig. 7. Fig. 9 is a diagram drawn without regard to scale or relative proportion of the parts shown, for the purpose of indicating the mode in which the groups of induction-bars are, by means of insulated rings at the end of the armature, appropriately connected with each other and with the commutator-strips.

The machine represented in the drawings is intended for the generation of currents large in quantity, but low in electro-motive force. It has a substantial bed, A, which may be made of heavy plank or masonry. Two rows of standards, B $b$, are arranged, respectively, across the opposite ends of the bed A, to which they are fastened by suitable bolts. Each of these standards is an iron bar, serving as a yoke-piece for one of the upper and one of the lower members of the groups of longer field-magnets C C $c\,c$. These magnets have hollow cores, the outer ends of which abut against the faces of the yokes and their inner ends against shoulders upon the pole-pieces D $d$. The yokes and cores are fastened to the pole-pieces by means of the bolts $C^2\,c^2$, which at their inner ends screw into holes tapped in the pole-pieces, and at their outer ends project through holes in the yokes or standards, and are provided with a screw-thread to receive the nuts $C^3\,c^3$, by which the pole-pieces, cores, and yokes are clamped together.

Immediately within the group of longer field-magnets are arranged similar groups of shorter field-magnets, C' C' $c'\,c'$, the cores of which are also hollow, and abut against suitable shoulders on the pole-pieces D $d$, and are secured in position by means of the bolts $C^4\,c^4$, the inner ends of which are screwed into holes tapped in the pole-pieces D $d$, while their outer ends project through holes in the shorter yokes B' $b'$, and are provided with screw-threads for the reception of the clamping-nuts $C^5\,c^5$, by which the shorter yoke-pieces and cores are fastened to the pole-pieces.

The upper and lower poles of the field-magnets are made up of separate sections. The sections $D'\,D^2\,D^3\,D^4\,D^5\,D^6$, composing the upper pole, are clamped together by the horizontal bolt E, and the sections $d'\,d^2\,d^3\,d^4\,d^5\,d^6$, composing the lower pole, are clamped together by the horizontal bolt $e$. Each section of each pole has bolted to it upon each side a pair of superposed magnets, each pair composed of one of the longer magnets and one of the shorter magnets. It will be seen, therefore, that each two sections which are in vertical alignment constitute part of a field-magnet frame, the other parts of which consist of the cores of four pairs of the longer and shorter field-magnets C C' $c'\,c'$, the four yoke-pieces B B' b b', to which the outer ends of the field-magnets are respectively secured, and the tie-plates F F', to which the opposed edges of the sections are respectively secured by the screws f f'. The drawings represent a machine having six of such magnet-frames, suitably secured in parallel planes. It will of course be understood that a larger or a smaller number of such magnet-frames may be employed, if desired, the dimensions of the other parts of the machine being correspondingly altered, as may be required.

The sections composing the poles are crescent-shaped, and their opposed faces are curved concentrically with relation to the axis of the rotating cylindrical cage composed of the parallel induction-bars G, supported in equidistant groups of five upon the peripheries of three rotating wheels, $G'$ $G^2$ $G^3$, the hubs of which are secured to the rotating shaft H.

The induction-bars are insulated from each other and from the wheels upon which they are supported, and are held in position by the clamping-segments $g'$ $g^2$ $g^3$, which are severally secured by screws $g$, inserted through the clamping-segments and into the peripheries of the supporting-wheels $G'$ $G^2$ $G^3$, respectively.

To afford clearance for the clamping-segment $g^2$ and the screws $g$, which fasten the clamps to the periphery of the wheel $G^2$, the middle pair of magnet-frames are separated by means of the washers $G^4$, which are interposed between the pole-pieces $D^3$ and $D^4$ and $d^3$ and $d^4$, respectively, through which the bolts E and $e$ respectively pass.

The core of the armature is divided into two sections by the interposition of the wheel $G^2$. These sections are respectively composed of the short hollow cylinders of iron, I I' $I^2$ $I^3$ and $i$ $i'$ $i^2$ $i^3$, which are supported by the arms J J' $J^2$ and $j$ $j'$ $j^2$, projecting radially from the hubs $J^3$ $J^4$ $J^5$ $j^3$ $j^4$ $j^5$, mounted upon the sleeves $h$ $h'$, which loosely inclose the armature-shaft H, so that the shaft H may be rotated without rotating the sleeves $h$ $h'$. The outer portions of the radial arms J J' $J^2$ $j$ $j'$ $j^2$ are interposed, respectively, between the cylinders I I' $I^2$ $I^3$ $i$ $i'$ $i^2$ $i^3$, and are perforated to receive the bolts K $k$, which are inserted through suitable holes in the shells of the cylinders, and are provided at their outer ends with the nuts $K'$ $K^2$ $k'$ $k^2$, by means of which the cylinders are clamped to each other and to the ends of the radial arms.

The armature-shaft H is provided with the bearing H' at the rear of the machine, and is prolonged to receive a driving-pulley, if the machine is driven by a belt, or to receive a crank when the machine is driven by direct connection with the piston of a steam-engine. At its front end the shaft H is provided with the bearing $H^2$, which projects sufficiently far from the wheel $G^3$ to afford room for the commutator M and the nests of concentric connecting-rings N, to which the front ends of the induction-bars G are appropriately connected. Similarly, the bearing H' at the rear end of the machine is sufficiently distant from the wheel G' to afford room for the nests of connecting-rings $n$, to which the rear ends of the induction-bars G are appropriately connected.

The induction-bars G are arranged in twenty-four groups, O O O, &c., each composed of five bars. The bars of the diametrically-opposite groups are in each case electrically connected with each other in series, so as to leave two terminals, which are respectively connected to two diametrically-opposite strips of the commutator M. As there are twenty-four terminals for the groups of induction-bars, the commutator is provided with twenty-four insulated strips, $m$. The appropriate electrical connection of the bars of each group with the bars of the diametrically-opposite group is effected by means of insulated rings at the ends of the armature. There being one hundred and twenty induction-bars, there are required at the rear end of the armature sixty connecting-rings. Fifty-six of these rings are arranged in eight parallel vertical planes, each plane containing a nest of seven rings. The remaining four rings are affixed to a sleeve mounted upon the commutator-shaft. Each ring has affixed to it, on opposite sides, two outwardly-projecting connecting-arms, the ends of which are fastened, respectively, to the rear ends of two of the induction-bars of two diametrically-opposite groups.

The connecting-arms have the same solid cross area as the induction-bars; but the rings have one-half the solid cross area. As will be seen, they are flattened rings, and they present two paths—right and left—for the current from one arm to the other, the sum of the cross areas of which is equal to the cross area of one induction-bar.

The relative positions of the nests of connecting-rings are shown in Fig. 5, in which it will be seen that the members of the three pairs of interior nests are placed in close proximity to each other, so that the connecting-arms can be arranged in four parallel vertical planes.

The fourteen connecting-arms (seven on each side of the shaft) attached to the innermost nest of rings are fastened to the outer faces of those rings. The fourteen connecting-arms attached to the second nest of rings are fastened to the inner faces thereof, two other connecting-arms being carried inward through the first and second nests of rings, and fastened on opposite sides, respectively, to the periphery of the ring on the shaft which is in line with the space between the first and second nests of rings. Similarly, the fourteen connecting-arms attached to the third nest of rings are fastened to the outer faces thereof, and the fourteen connecting-arms attached to the fourth nest of rings are attached to the inner faces thereof, the two additional arms in that case, as before, being attached to the ring in line with the space between the third and fourth nests of rings. Again, the fourteen connecting-arms of the fifth and seventh nests of rings are attached, respectively, to the outer faces of those rings, and the fourteen connecting-arms of the sixth and eighth nests of rings are attached to the inner faces thereof, the additional connecting-arms in each case, as before, being attached to the rings in line with the spaces between the fifth and sixth and seventh and eighth nests of rings, respectively.

On the front end of the machine the twenty-four terminals of the various groups of induction-bars are connected with the commutator-strips, and hence at the front end of the armature twelve less connecting-rings are required, or forty-eight in all. At the front end, therefore, there are eight nests, each consisting of six rings. The manner in which these connections are effected is illustrated in Fig. 9, which is a diagram drawn without regard to scale, and arbitrarily representing the front end of the armature and the commutator-strips, indicating in solid black lines the connecting-arms by which the front ends of the induction-bars are connected to their appropriate rings and to the commutator-strips, and indicating in parallel dotted lines, in close proximity to the solid lines, the connections of the rear ends of the induction-bars with the rings at the rear ends of the armature. The nests of rings at the rear end of the armature are numbered 1, 2, 3, 4, 5, 6, 7, and 8, respectively, and the rings upon the shaft are numbered, respectively, $1\frac{1}{2}$, $3\frac{1}{2}$, $5\frac{1}{2}$, and $7\frac{1}{2}$. The nests of rings at the front end of the machine are numbered, respectively, 1', 2', 3', 4', 5', 6', 7', and 8', and these figures adjoining the arrow-heads at the ends of the solid and dotted lines, respectively, in Fig. 9 indicate to which nest the rings to which the connecting-arms are attached respectively belong, and also the positions of the said rings relatively to the other rings in the nests of which they are respectively members.

It will be seen that by this mode of connection all of the commutator-strips upon the lower side of the neutral plane are of one polarity, and all the commutator-strips upon the other side of the neutral plane are of the opposite polarity. Collecting-brushes $q$ are therefore arranged to bear upon all of the strips, both above and below the neutral plane, as shown in Fig. 7.

The brushes are carried, respectively, in suitably-insulated segmental brush-holders, Q Q' Q² Q³, which are suitably insulated from the adjacent parts of the machine, and are electrically connected, respectively, with the binding-posts R $r$, as seen in Fig. 2, to which the terminals of the outside circuit are respectively connected. The commutator-brushes are literally brushes with flexible wire teeth. The segments in which the teeth are supported are made capable of radial adjustment by means of the slotted holes in the ears $q'$, through which are inserted the bolts $q^2$, by which the segmental brush-holders are screwed to a supporting-disk, $q^3$, which is fastened by means of set-screws upon the inner end of the box in which the armature-shaft has its bearing H².

In operation, the cylindrical core of the armature is held stationary by the magnetic attraction of the field-magnets, and to insure that the shaft H will turn freely in the sleeves $h$ and $h'$ without imparting rotation to them, each of these sleeves has formed in its lower portion a longitudinal oil-cavity, S. Strips of cotton wicking are laid edgewise in the cavities S, respectively. The upper edges of these strips bear, respectively, upon those parts of the periphery of the shaft H which are surrounded by the sleeves $h\ h'$, which, as will be seen, are of larger diameter than the adjoining portions of the shaft H. The ends of the cavities S are closed by means of plates which are bolted to the ends of the sleeves $h\ h'$, respectively. The parts of the shaft inclosed by the sleeves $h\ h'$ are oiled, and oil is supplied to the cavities S through the tubes S' S', inserted into the upper ends of the holes $s'\ s'$, bored through the sleeves $h\ h'$, respectively. These holes are inclined to the radius of the shaft, as shown in Fig. 4, in which the direction of rotation of the shaft H is indicated by the arrow H³. Owing to the enlarged diameter of the parts of the shaft surrounded by the sleeves $h\ h'$, respectively, the effect of centrifugal force is to keep the oil upon the periphery of the enlarged portion, and to prevent it from spreading lengthwise upon the adjoining parts of the shaft, which are of smaller diameter.

I am aware that in cylindrical armatures heretofore designed the induction-coils have been arranged to rotate around an iron core fixed to a stationary shaft, by supporting the coils upon suitable heads or wheels affixed to sleeves or hubs surrounding external portions of said shaft, the necessary power to rotate the coils being imparted by means of a belt engaging a pulley affixed to one of the heads. The features which distinguish my invention from such previously-designed armatures consist of the rotating armature-shaft, to which the wheels for supporting the induction-bars are affixed, and the loose mounting of the iron core upon the said shaft.

I claim as my invention—

1. In a dynamo-electric machine having stationary field-magnets and a cylindrical armature, a rotating system of induction-bars, arranged in the form of a cylindrical cage and loosely surrounding a stationary cylindrical iron core.

2. In a cylindrical armature for a dynamo-electric machine, provided with longitudinally-circumposed groups of induction-bars, a series of nests of insulated connecting-rings at each end of the armature, for effecting the appropriate electrical connections of the induction-bars with each other, substantially as described.

3. A cylindrical armature for a dynamo-electric machine, having an internal iron core loosely mounted upon the armature-shaft, and a rotating system of induction bars or coils independent of the said iron core and appropriately connected with each other and with the commutator-strips, and supported upon the peripheries of two or more wheels fastened to and revolving with the armature-shaft.

4. In a dynamo-electric machine, substantially such as described, in which the cage of induction bars or coils is rotated around a cylindrical iron core loosely mounted upon the armature-shaft, one or more sleeves, $h\ h'$, each provided with the oil-supply hole $s'$, extending through the upper part of the sleeve and terminating at its lower end in the oil-cavity S, formed in the interior surface of the sleeve and containing a strip of suitable material for absorbing oil, in combination with the enlarged part of the shaft H, which the sleeve surrounds, as and for the purposes set forth.

GEO. W. FULLER.

Witnesses:
 Jos. C. EARLE,
 J. H. SHUMWAY.